Figure 1:
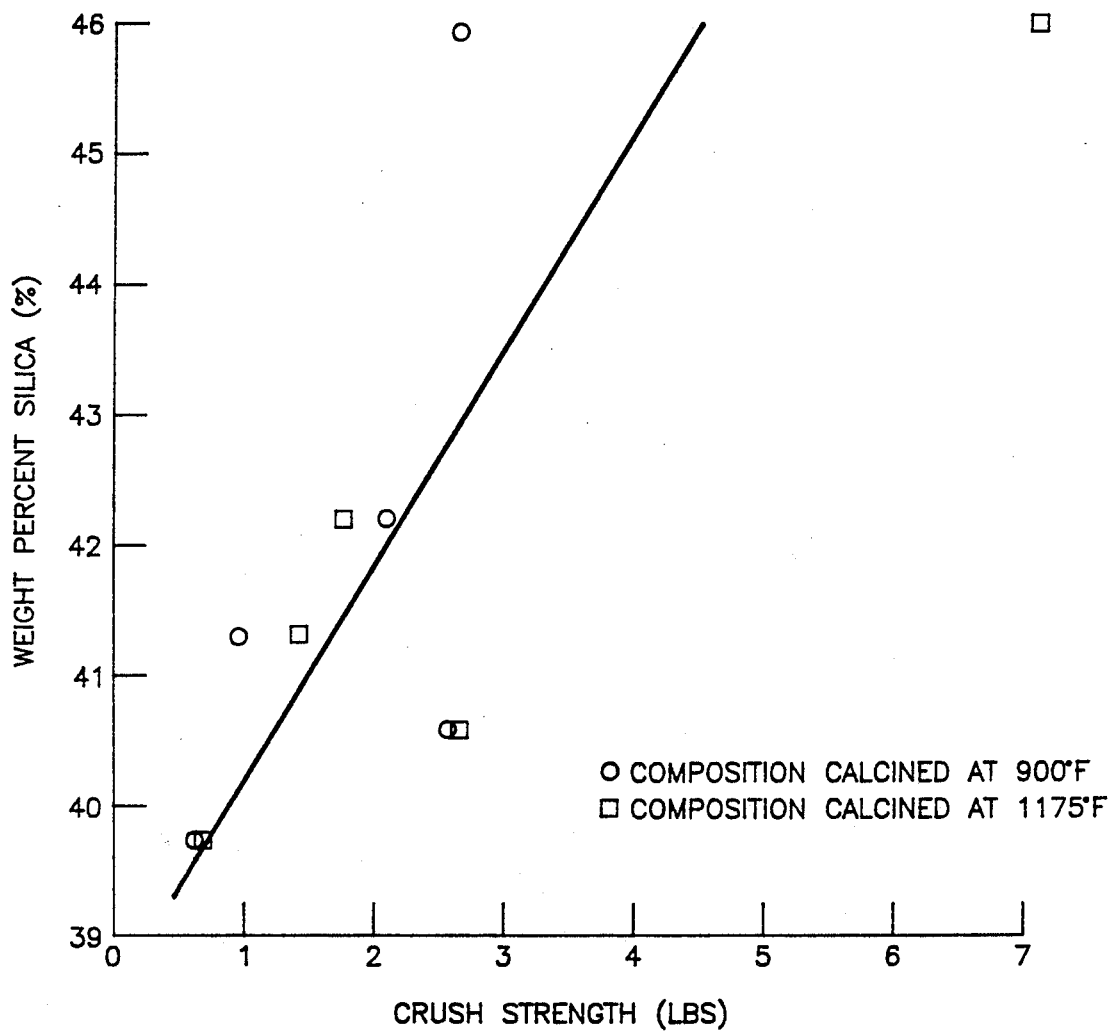

United States Patent [19]

Schubert et al.

[11] Patent Number: 5,108,975
[45] Date of Patent: Apr. 28, 1992

[54] COMPOSITION AND METHOD OF MAKING HIGH POROSITY, HIGH STRENGTH COMPOSITIONS

[75] Inventors: Paul F. Schubert, Sunnyvale, Calif.; Donald H. Kubicek, Bartlesville, Okla.

[73] Assignee: Phillips Petroleum Company, Bartlesville, Okla.

[21] Appl. No.: 646,042

[22] Filed: Jan. 28, 1991

[51] Int. Cl.$^5$ .............................. B01J 20/10
[52] U.S. Cl. ............................ 502/232; 502/224
[58] Field of Search ............... 502/224, 232; 423/341

[56] References Cited

U.S. PATENT DOCUMENTS

| | | | |
|---|---|---|---|
| 2,657,114 | 10/1953 | Wagner | 502/224 |
| 3,271,107 | 9/1966 | Nickerson et al. | 502/232 |
| 3,494,875 | 2/1970 | Le Page et al. | 502/243 |
| 3,696,053 | 10/1972 | Le Page et al. | 502/224 |
| 3,975,299 | 8/1976 | Crathorne et al. | 502/224 |
| 4,135,941 | 1/1979 | Skalay et al. | 106/100 |
| 4,402,924 | 9/1983 | McVicker et al. | 502/224 |
| 4,436,669 | 3/1984 | Jacques et al. | 502/224 |

*Primary Examiner*—Carl F. Dees
*Attorney, Agent, or Firm*—Charles W. Stewart

[57] ABSTRACT

Described is a method for preparing a catalyst support material, comprising commercially available silica, by utilizing a fluorine-containing acid. The novel method is utilized to produce a novel composition that has unique physical properties different from those of typical commercially available silica materials. The novel support material has significantly improved values for crush strength and as good or better pore volume than comparable catalyst support materials. Due to these improved physical properties, the novel composition is more durable and longer lived. Furthermore, the greater pore volume of the novel composition provides for enhanced catalytic activity when the formed silica material is utilized as a catalyst support.

28 Claims, 1 Drawing Sheet

COMPOSITION AND METHOD OF MAKING HIGH POROSITY, HIGH STRENGTH COMPOSITIONS

This invention relates to silica compositions having high porosity and high crush strength.

Silica is often used as an inert support material for active metal catalysts because of its high porosity and high total surface area. It is desirable to have a support material that has a high total surface area and high porosity in order to improve catalytic activity by providing for easy permeability and diffusion of reacting compounds within the pores of the catalyst support material. One disadvantage to the use of silica as a catalyst support is the inability to provide a pure silica support mass, without the use of a binder, that has sufficient crush strength to withstand process operating conditions without excessive degradation. A catalyst support with a low crush strength often is highly susceptible to attrition by chipping and fracture of the support surfaces.

It is, thus, an object of this invention to provide a catalyst support composition having both a high crush strength and high porosity.

It is also an object of this invention to provide method for producing a catalyst support composition having both high crush strength and high porosity.

In accordance with this invention, a composition having a crush strength between about 0.6 to about 11 pounds and a pore volume between about 0.71 to about 1.8 milliliters per gram comprising silica is provided.

Furthermore, a method for producing a strength enhanced composition having a high porosity is provided which comprises mixing silica and an aqueous fluorine-containing acid solution to form a homogeneous mixture, agglomerating said homogeneous mixture to form an agglomerate, and calcining said agglomerate to produce a formed silica compound.

Other aspects, objects and advantages of this invention will become apparent from a study of this disclosure, the appended claims and the drawing in which:

FIG. 1 is a plot of the crush strength versus the weight percent silica for the various compositions that have been calcined at two separate temperatures of 900° F. and 1175° F.

It has been found that a silica composition having unique physical properties can be produced. The silica composition as described herein has specific physical properties that provide for a material suitable for the support of active metal catalysts. Because of the unique physical properties of the silica composition, catalytic activity is enhanced due to its high porosity, and catalyst life is increased due to the high crush strength of the silica material.

The starting silica material used as a component of this invention can be any suitable form of silica including, but not limited to, naturally occurring silicas, such as diatomaceous earth, which is also referred to as kieselguhr or diatomite or zeolite, and synthetic silicas, such as zeolites, high silica zeolites, precipitated or spray dried silicas or clay, and plasma-treated silica or clay.

There are many commercially available silica materials that can be used as a part of the inventive composition. One such silica is diatomaceous earth, which also contains impurities. Because of the nature of diatomaceous earth, the types and amounts of impurities are highly variable and depend upon the source of the particular diatomaceous earth. Typical chemical analyses of a diatomaceous earth from various sources are given in Table I below as taken from the *Encyclopedia of Chemical Technology*, 3rd Edition, volume 7, page 606. Generally, commercially available diatomaceous earth is a mixture of metal oxides having a silica ($SiO_2$) content of from about 87 weight percent to about 94 weight percent, and alumina ($Al_2O_3$) content of from about 2 weight percent to about 4 weight percent and numerous other trace quantities of metal oxides.

TABLE I

Typical Spectrographic Analysis of Various Diatomaceous Earths (Dry Basis)

| Constituent, % | Deposit | | |
|---|---|---|---|
| | Lompoc, CA | Besalt, NV | Sparks, NV |
| $SiO_2$ | 88.90 | 83.13 | 87.81 |
| $Al_2O_3$ | 3.00 | 4.60 | 4.51 |
| CaO | 0.53 | 2.50 | 1.15 |
| MgO | 0.56 | 0.64 | 0.17 |
| $Fe_2O_3$ | 1.69 | 2.00 | 1.49 |
| $Na_2O$ | 1.44 | 1.60 | 0.77 |
| $V_2O_5$ | 0.11 | 0.05 | 0.77 |
| $TiO_2$ | 0.14 | 0.18 | 0.77 |
| Ignition Loss | 3.60 | 5.30 | 4.10 |

Commercially available synthetic silicas also can be used as a starting component of the novel composition. The purity of the commercially available synthetic silicas, however, is much greater than that of commercially available diatomaceous earth compounds and can approach levels greater than 99 weight percent silica. Provided in Table II is a typical chemical analyses of a commercially available synthetic silica material. It is preferred that the silica of the novel composition herein be present in the range of at least about 85 weight percent based on the total weight of the composition. Most preferably, silica should be present in an amount greater than 95 weight percent of the total weight of the composition.

TABLE II

| Typical Analysis of Commercially Available Silica Material | |
|---|---|
| CHEMICAL ANALYSIS: | |
| (Wt. %, Dry Basis @ 1750° F.) | |
| Total Volatile @ 150° F. | 6.0–12.0 |
| Silica, $SiO_2$ | 99.0–99.99 |
| Alumina, $Al_2O_3$ | 0.05 ± 0.05 |
| Sodium, $Na_2O$ | 0.10 ± 0.10 |
| Sulfate, $SO_4$ | 0.05 ± 0.05 |
| Iron, Fe | 0.03 ± 0.03 |
| Calcium, CaO | 0.10 ± 0.10 |
| Chlorine, Cl | <0.1 |
| PHYSICAL PROPERTIES: | |
| Surface Area, $m^2$/gm | 300–750 |
| Pore Volume, cc/gm | .43–4.65 |
| Packed Density, gm/cc | 0.35–0.7 |

In preparing the novel composition, a fluroine-containing acid solution is used as a binder to assist in the forming of a silica agglomerate and to treat the surface of the silica compound to provide a composition having a high crush strength, a suitably large pore volume and porosity. Any suitable fluorine-containing inorganic or mineral acid can be used which provides the desirable physical properties and which serves as an effective binder in the formation of a silica agglomerate. Such fluorine-containing inorganic mineral acids can, for example, comprise fluotitanic acid ($H_2TiF_6$), fluoboric acid ($HBF_4$), fluophosphoric acid ($H_2PO_3F$), difluorophosphoric acid ($HPO_2F_2$), hexafluorophosphoric acid ($HPF_6$), fluosilicic acid ($H_2SiF_6$), and hydrofluoric acid (HF). The preferred acid for use in this invention is hydrofluoric acid.

Any effective amount of fluorine-containing acid can be used to treat the silica material in order to provide the desired binding effect and to provide the desired crush strength and porosity. Generally, the fluorine-containing acid is utilized in the form of an aqueous solution of a fluorine-containing acid compound. Any suitable concentration of the aqueous solution can be used, but preferably, the concentration of the fluorine-containing acid compound in the aqueous solution will range from about 1 to about 4 parts by weight of the fluorine-containing acid compound per from about 40 to about 70 parts by weight of water to form the aqueous solution. Preferably, the aqueous solution will have a concentration in the range of from 2 to 3 parts by weight of the fluorine-containing acid compound per from 45 to 60 parts by weight of water. The most preferred concentration range of the aqueous solution will be from 2 to 3 parts by weight of a fluorine-containing acid compound per from 50 to 55 parts by weight of water.

When treating the silica material with an aqueous fluorine-containing acid solution, it is desirable to mix the aqueous solution with the silica in a ratio that will provide the desired binding effect and that will provide a final silica composition having the desirable crush strength and porosity. Generally, the ratio of silica to aqueous solution will be between about 30 and about 60 parts by weight of silica per from about 40 to about 75 parts by weight of aqueous solution. Preferably, however, the ratio shall be from 35 to 55 parts by weight silica per 45 to 65 parts by weight of the aqueous solution. Most preferably, the ratio of silica to aqueous solution shall be from 40 to 50 parts by weight silica per from 50 to 60 parts by weight of aqueous solution.

In treating the silica material, the fluorine-containing acid solution can be mixed with the silica by any suitable method that will provide for the desired degree of mixing. These components can be mixed in a batch-wise fashion or a continuous fashion provided that the components are throughly and intimately mixed prior to further processing. Suitable types of batch mixers include, but are not limited to, change-can mixers, stationary-tank mixers, double-arm kneading mixers having any suitable type of agitator or blades such as sigma blades, dispersion blades, multi-wiping overlap blades, single curve blades, double-nabin blades and the like. Suitable types of continuous mixers can include, but are not limited to, single or double screw extruders, trough-and-screw mixers and pugmills. To achieve the desired dispersion of the aqueous solution and the silica components, the materials are mixed until a homogenous mixture is formed. The mixing time should be sufficient to give a uniform mixture and, generally, will be less than about 45 minutes. Preferably, the mixing time will be in the range from about 2 minutes to about 15 minutes.

The treating of the silica material with a fluorine-containing acid aids in the agglomeration of a formed silica agglomerate and improves the physical strength and porosity of the agglomerate. Generally, the agglomeration step is utilized to provide a formed silica agglomerate in any desirable form such as spheroids, pills or tablets, cylinders, irregular extrusions or merely loosely bound agglomerates or clusters.

Any suitable method of agglomeration known in the art can be used. Examples of such methods include, but are not limited to, molding, tabletting, pressing, pelletizing, extruding, and tumbling. The preferred method, however, is by extrusion. Any of the various types of extrusion methods and extrusion equipment known in the art can be used. It is preferred to use either a single screw extruder or a double screw extruder that uses a screw or auger to convey or force the treated silica material through a die plate to produce the desirable shapes or extrusion profiles.

The thus formed agglomerate can then undergo a calcination step wherein the agglomerate is calcined in the presence of an oxygen-containing gas at a temperature suitable for achieving the desired degree of calcination, for example, generally in the range of from about 700° F. to about 1400° F. Preferably, the calcination temperature should range from 850° F. to 1250° F. and, most preferably, the calcination temperature should range from 900° F. to 1175° F. The calcination step is conducted for a period of time suitable for achieving the desired degree of calcination; but, generally, the time shall range from about 0.5 hour to about 4 hours. Most preferably, the calcination time shall range from 1 hour to 3 hours to produce the calcined agglomerate material.

An optional embodiment of this invention is to utilize an additional agglomeration step which follows the earlier described agglomeration step or first agglomeration step. It has unexpectedly been discovered that by re-extruding an already extruded silica material, which has been previously treated with a fluorine-containing aqueous acid solution, the crush strength and pore volume of the finally formed composition will significantly and materially be improved over those properties of the composition that exists after the first extrusion step but prior to the second extrusion step.

The composition of matter of this invention can have any suitable crush strength and pore volume. In general, the crush strength shall range from about 0.1 to about 12 pounds, preferably it shall range from 1 to 11 pounds. Most preferably, for a material to be commercially useable as a catalyst support, it is desirable that it have a crush strength greater than 4 pounds and, most preferably, the crush strength should range from 4 to 9 pounds. As referred to herein, the value representing "crush strength" is determined by the American Society for Testing Materials (ASTM) Standard Test Method D 4179-88A entitled "Standard Test Method for Single Pellet Crush Strength to Form Catalyst Shapes." This standard ASTM test D 4179-88A is incorporated herein and made a part hereto by reference.

As for the porosity of the composition of matter of this invention, any suitable pore volume can be obtained by utilizing the novel features of this invention. It is desirable to have a large pore volume in order to enhance the catalyst activity of any of the catalyst metals that are supported by the composition of matter of this invention. Generally, the pore volume of the composition should be at least about 0.3 cc/gm. Preferably, the pore volume should range from about 0.3 to about 2.0 cc/gm; and, most preferably, the pore volume should range from 0.71 to 1.8 cc/gm. The value representing "pore volume", as referred to herein, is determined by the method of mercury intrusion prosimetry as completely described by the ASTM method D 4284-88 entitled "Standard Test Method for Determining Pore Volume Distribution of Catalyst by Mercury Intrusion Porosimetry." This standard ASTM test method D 4284-88 is incorporated herein and made a part hereto by reference.

The acid treating method described herein provides the unexpected results of improving the porosity and calcined crush strength of typical silica materials. By carefully controlling the ratio of silica and aqueous fluorine-containing acid solution within certain critical ranges, the crush strength of the silica composition can be significantly and materially improved over that of a silica mass that has not undergone the acid treatment. Furthermore, the utilization of acid treating of the composition provides for an improved pore volume over that which exists without acid treating. Improvements in both of these physical properties are desirable for providing an improved metal catalyst support material. A support material having high crush strength provides for a long lived and durable catalyst that can be used under severe operating services. A support having a high pore volume provides for enhanced catalytic activity.

Following is provided an example for the further illustration of the invention, but it is not to be considered as unduly limiting the scope of this invention.

EXAMPLE I

This example illustrates the novel method of preparing the novel composition of matter and the benefits which are achievable from utilizing a fluorine-containing acid for treating a silica compound to produce a composition having a high crush strength and high porosity.

A formed silica particle was prepared by using hydrogen fluoride acid as a binder. A commercially available amorphous silica material known by its tradename as Davison Grade 57 Silica, was obtained from the Davison Chemical Division of W. R. Grace and Company. A ⅛-inch diameter silica extrudate was formed by utilizing an aqueous HF acid solution followed by drying and calcining at different temperatures in order to determine the effect of calcination temperature upon pore volume and crush strength. The final calcined extrudates showed a better crush strength than that of the original material without the utilization of an aqueous HF solution and the extrudate showed an equal or greater total porosity. Furthermore, because of the binder properties of the HF acid solution, a more regularly shaped extrudate was produced. This more uniformly shaped extrudate can provide a support material that is less susceptible to attrition when used in severe operating services.

The extrudates were prepared by mixing the amorphous silica material with an aqueous HF acid solution in a small lab sigma mixer. The resulting mixture was extruded using a lab-size Bonnot single screw extruder. The extrudate was dried for 2 hours at 392° F. in a muffle furnace or drying oven. Following the drying step, samples of the extrudate were dried at two separate temperatures of 900° F. and 1175° F., each for a period of 3 hours, in a muffle furnace. The physical properties of the calcined extrudate were subsequently determined with the crush strength being measured by using the standard ASTM D 4179-88A testing method and with the pore volume being measured by using the standard ASTM D 4284-88 test method. Provided in Table III are compositions that were prepared using the method described above with compositions A through E showing the weight percent of silica, HF and water in the extruded mixture. Also, provided in Table IV are the measured physical properties of the calcined compositions. The extrudates were calcined at two separate temperatures: 900° F. and 1175° F. The data represented in Table IV for crush strength of the composition is further illustrated in FIG. 1 in order to more clearly demonstrate the improvement in crush strength that is achievable by the careful control of the ratio of silica to an HF aqueous solution in preparing the composition. The data show that a significant improvement in crush strength is achievable by carefully controlling the amount of aqueous HF acid solution mixed with silica prior to the extrusion of the resulting mixture. It also demonstrates that the pore volume is not negatively impacted in any way by using an aqueous HF acid solution, and pore volume is improved over that of the original material. The data show that the utilization of an aqueous HF acid solution can be used to carefully control the crush strength of a calcined agglomerate of silica, and it can be used to improve the pore volume of the initial starting material.

TABLE III

| Weight Percent of Components of the Mixture Extruded | | | | | |
|---|---|---|---|---|---|
| | Composition (weight %) | | | | |
| | A | B | C | D | E |
| Silica | 39.7 | 40.5 | 41.2 | 42.1 | 45.7 |
| HF | 2.3 | 2.3 | 2.4 | 2.4 | 2.6 |
| Water | 58.0 | 57.2 | 56.4 | 55.5 | 51.7 |

TABLE IV

| | Measured Physical Properties of the Calcined Compositions | | | |
|---|---|---|---|---|
| | Calcination Temp. (900° F.) | | Calcination Temp. (1175° F.) | |
| Composition | Crush Strength (lbs) | Pore Volume (cc/gm) | Crush Strength (lbs) | Pore Volume (cc/gm) |
| A | 0.638 | 1.74 | 0.678 | 1.67 |
| B | 2.55 | 1.4 | 2.63 | 1.42 |
| C | 0.94 | 1.54 | 1.41 | 1.6 |
| D | 2.08 | 1.6 | 1.74 | 1.65 |
| E | 2.67 | 0.66 | 7.09 | 0.98 |

While this invention has been described in detail for purposes of illustration, it is not to be construed as limited thereby but is intended to include all reasonable variations and modifications within the scope and spirit of the described invention and the appended claims.

That which is claimed is:

1. A composition having a crush strength between about 0.6 to about 11.1 pounds and a pore volume between about 0.71 to about 1.8 milliliters per gram, comprising: silica.

2. A composition as recited in claim 1 wherein the silica has been treated with an aqueous fluorine-containing acid solution.

3. A composition as recited in claim 2 wherein the silica is an agglomerate of formed particles having a size suitable for use as a catalyst support.

4. A composition as recited in claim 3 wherein said agglomerate has been calcined.

5. A composition as recited in claim 4 wherein the treatment of the silica with said aqueous fluorine-containing acid solution comprises:
   mixing between about 30 and about 60 parts by weight silica with between about 40 and about 75 parts by weight said aqueous fluorine-containing acid solution, having a concentration of a fluorine-containing acid compound from about 1 to about 4 parts by weight of said fluorine-containing acid compound per from about 40 to about 70 parts water, to form a mixture prior to agglomerating said mixture to form said agglomerate.

6. A composition as recited in claim 5 wherein the calcination of said agglomerate is conducted in the presence of an oxygen-containing gas at a temperature in the range of from about 700° F. to about 1400° F. for a period of time of from about 0.5 hour to about 4 hours.

7. A composition as recited in claim 6 wherein said fluorine-containing compound of said aqueous fluorine-containing acid solution is selected from the group consisting of dihydrogen hexafluorotitanate, tetrafluoroboric acid, phosphorofluoridic acid, hydrogen hexafluorophosphate, dihydrogen hexafluorosilicate, hydrofluoric acid, and combinations of any two or more thereof.

8. A composition as recited in claim 7 wherein said fluorine-containing compound is hydrofluoric acid.

9. A composition having a crush strength between about 0.6 and about 7.1 pounds and a pore volume between about 0.71 and about 1.8 milliliters per gram, comprising:
   a formed silica compound having been treated with an aqueous hydrofluoric acid solution, having a concentration of hydrofluoric acid from about 1 to about 4 parts per from about 40 to about 70 parts water, to form a mixture, which is subsequently agglomerated, and then calcined to produce said formed silica compound.

10. A method of producing a strength-enhanced composition having a high porosity, which comprises:
    mixing silica and an aqueous fluorine-containing acid solution to form a homogeneous mixture;
    agglomerating said homogeneous mixture to form an agglomerate; and
    calcining said agglomerate to produce a formed silica compound.

11. A method as recited in claim 10 wherein the amount of silica used in said mixing step is between about 30 and about 60 parts by weight and the amount of said aqueous fluorine-containing acid solution, having a concentration of a fluorine-containing compound from about 1 to about 4 parts by weight per from about 40 to about 70 parts by weight water, is between about 40 to about 75 parts by weight.

12. A method as recited in claim 11 wherein said calcination step is conducted in the presence of an oxygen-containing gas at a temperature in the range of from about 700° F. to about 1400° F. for a period of time of from about 0.5 hour to about 4 hours.

13. A method as recited in claim 12 wherein said fluorine-containing compound of said fluorine-containing acid solution is selected from the group consisting of dihydrogen hexafluorotitanate, tetrafluoroboric acid, phosphorofluoridic acid, hydrogen hexafluorophosphate, dihydrogen hexafluorosilicate, hydrofluoric acid, and combinations of any two or more thereof.

14. A method as recited in claim 13 wherein said fluorine containing compound is hydrofluoric acid.

15. A method as recited in claim 14 further comprising the step of re-agglomerating said agglomerate prior to said calcining step.

16. A method as recited in claim 15 wherein said agglomerating step is selected from the group of process steps consisting of molding, tableting, pressing, pelletizing, extruding, and tumbling and wherein said re-agglomerating step is selected from the group of process steps consisting of molding, tableting, pressing, pelletizing, extruding, and tumbling.

17. A method as recited in claim 16 wherein said agglomerating step is extruding and wherein said re-agglomerating step is extruding.

18. A method as recited in claim 17 wherein said formed silica compound has a crush strength between about 0.6 to about 7.1 pounds and a pore volume between about 0.71 to about 1.8 milliliters per gram.

19. A method of producing a strength-enhanced composition having a high porosity, which comprises
    mixing between about 30 and about 60 parts by weight silica and between about 40 to about 75 parts by weight aqueous hydrofluoric acid solution having a concentration of hydrofluoric acid of from about 1 to about 4 parts by weight per from about 40 to about 70 parts by weight water to form a homogeneous mixture;
    extruding said homogeneous mixture to form an extrudate; and
    re-extruding said extrudate followed by calcining in the presence of an oxygen-containing gas at a temperature in the range of from about 700° F. to about 1400° F. for a period of from about 0.5 hour to about 4 hours.

20. A composition prepared by the method of claims 10, 11, 12, 13, 14, 15, 16, 17, 18, or 19.

21. A composition having a crush strength between about 0.6 to about 7.1 and a pore volume between about 0.71 to about 1.8, comprising:
    at least about 85 percent by weight silica.

22. A composition as recited in claim 21 wherein the silica has been treated with an aqueous fluorine-containing acid solution.

23. A composition as recited in claim 22 wherein the silica is an agglomerate of formed particles having a size suitable for use as a catalyst support.

24. A composition as recited in claim 23 wherein said agglomerate has been calcined.

25. A composition as recited in claim 24 wherein the treatment of the silica with said aqueous fluorine-containing acid solution comprises:
    mixing between about 30 and about 60 parts by weight silica with between about 40 and about 75 parts by weight said aqueous fluorine-containing acid solution, having a concentration of a fluorine-containing acid compound from about 1 to about 4 parts by weight of said fluorine-containing acid compound per from about 40 to about 70 parts water, to form a mixture prior to agglomerating said mixture to form said agglomerate.

26. A composition as recited in claim 25 wherein the calcination of said agglomerate is conducted in the presence of an oxygen-containing gas at a temperature in the range of from about 700° F. to about 1400° F. for a period of time of from about 0.5 hour to about 4 hours.

27. A composition as recited in claim 26 wherein said fluorine-containing compound of said aqueous fluorine-containing acid solution is selected from the group consisting of dihydrogen hexafluorotitanate, tetrafluoroboric acid, phosphorofluoridic acid, hydrogen hexafluorophosphate, dihydrogen hexafluorosilicate, hydrofluoric acid, and combinations of any two or more thereof.

28. A composition as recited in claim 27 wherein said fluorine-containing compound is hydrofluoric acid.

* * * * *